United States Patent
Sano et al.

(10) Patent No.: US 8,261,534 B2
(45) Date of Patent: Sep. 11, 2012

(54) EXHAUST GAS PURIFYING APPARATUS FOR INTERNAL COMBUSTION ENGINE

(75) Inventors: Keisuke Sano, Susono (JP); Takaaki Itou, Mishima (JP); Kimikazu Yoda, Susono (JP); Kazuhiro Wakao, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 319 days.

(21) Appl. No.: 12/599,537

(22) PCT Filed: Apr. 28, 2008

(86) PCT No.: PCT/JP2008/058512
§ 371 (c)(1),
(2), (4) Date: Nov. 10, 2009

(87) PCT Pub. No.: WO2008/142999
PCT Pub. Date: Nov. 27, 2008

(65) Prior Publication Data
US 2010/0205939 A1    Aug. 19, 2010

(30) Foreign Application Priority Data
May 14, 2007   (JP) ................. 2007-128513

(51) Int. Cl.
*F01N 11/00* (2006.01)
*F01N 3/10* (2006.01)
*F01N 9/00* (2006.01)
*F02D 41/00* (2006.01)

(52) U.S. Cl. ............... 60/285; 60/295; 60/297; 60/287; 60/288; 60/311

(58) Field of Classification Search ............. 60/295, 60/297, 287, 288, 311
See application file for complete search history.

(56) References Cited

U.S. PATENT DOCUMENTS

| | | | | |
|---|---|---|---|---|
| 4,413,601 A | * | 11/1983 | Matsuoka et al. | 123/480 |
| 4,941,318 A | * | 7/1990 | Matsuoka | 60/274 |
| 5,307,627 A | | 5/1994 | Christensen et al. | |
| 5,388,405 A | * | 2/1995 | Fujishita et al. | 60/297 |
| 5,388,406 A | * | 2/1995 | Takeshima et al. | 60/297 |
| 5,398,503 A | | 3/1995 | Danno et al. | |

(Continued)

FOREIGN PATENT DOCUMENTS

| | | |
|---|---|---|
| EP | 0 727 567 A1 | 8/1996 |
| EP | 0 984 142 A1 | 3/2000 |
| JP | 2-67020 | 5/1990 |
| JP | 08-284645 | 10/1996 |

(Continued)

*Primary Examiner* — Kenneth Bomberg
*Assistant Examiner* — Brandon Lee
(74) *Attorney, Agent, or Firm* — Finnegan, Henderson, Farabow, Garrett & Dunner, LLP (57) ABSTRACT

A main exhaust passage 42 and a first bypass passage 46 bypassing the main exhaust passage 42 are provided. An absorbent 52 having a function of absorbing HC components and NOx components contained in exhaust gas is provided in the first bypass passage 46. An underfloor catalyst 56 including a catalyst with an electric heater (EHC) 58 is provided in a main exhaust passage 42 on a downstream side of a downstream connecting portion 48b in a first bypass passage 46. A second bypass passage 62 that provides communication between the main exhaust passage 42 downstream of the underfloor catalyst 56 and the first bypass passage 46 upstream of the absorbent 52 is provided. A first exhaust switching valve 50 is provided in an upstream connecting portion 48a, and a second exhaust switching valve 68 is provided in a main exhaust passage side connecting portion 64a. A pump 66 is provided in the middle of the second bypass passage 62.

5 Claims, 4 Drawing Sheets

U.S. PATENT DOCUMENTS

| | | | |
|---|---|---|---|
| 5,524,433 A | 6/1996 | Adamczyk, Jr. et al. | |
| 5,560,201 A * | 10/1996 | Fujishita et al. | 60/279 |
| 5,910,293 A * | 6/1999 | Hemingway et al. | 423/213.7 |
| 2005/0132696 A1 * | 6/2005 | Tumati et al. | 60/282 |
| 2005/0220679 A1 | 10/2005 | Choi | |

FOREIGN PATENT DOCUMENTS

| | | |
|---|---|---|
| JP | 10-252449 | 9/1998 |
| JP | 2005-299631 | 10/2005 |
| WO | WO 98/48153 | 10/1998 |

* cited by examiner

(A) Absorbing operation / Exhaust purging operation (B) Forced purging operation (C) Restart

Fig. 4

EXHAUST GAS PURIFYING APPARATUS FOR INTERNAL COMBUSTION ENGINE

CROSS-REFERENCE TO RELATED APPLICATIONS

This application is a national phase application of International Application No. PCT/JP2008/058512, filed Apr. 28, 2008, and claims the priority of Japanese Application No. 2007-128513, filed May 14, 2007, the contents of both of which are incorporated herein by reference.

TECHNICAL FIELD

The present invention relates to an exhaust gas purifying apparatus for an internal combustion engine, and more particularly to an exhaust gas purifying apparatus including an absorbent for absorbing certain components in exhaust gas that cannot be purified by an exhaust gas purifying catalyst before activation of the exhaust gas purifying catalyst.

BACKGROUND ART

An automobile exhaust gas purifying system including an HC absorber catalyst for absorbing HC and an NOx absorber catalyst for absorbing NOx placed upstream of an exhaust gas purifying catalyst has been disclosed, for example, in Patent Document 1. In the conventional purifying system, exhaust gas before activation of the exhaust gas purifying catalyst, is absorbed by the HC absorber catalyst and the NOx absorber catalyst. Then, after the activation of the exhaust gas purifying catalyst, exhaust gas is passed through the HC absorber catalyst or the like, and thus HC and NOx absorbed by the HC absorber catalyst or the like are separated from the absorber catalysts and purified by the exhaust gas purifying catalyst.

Including the above-mentioned document, the applicant is aware of the following document as a related art of the present invention.
[Patent Document 1] Japanese Laid-Open Patent Application No. 2005-299631

DISCLOSURE OF INVENTION

However, in the system in which HC and NOx exhausted at the cold start are absorbed by the HC absorbent and the NOx absorbent placed in the same path, and HC and NOx absorbed by the absorbents are separated after the activation of the exhaust gas purifying catalyst as in the above described conventional technique, timing of separation of HC from the HC absorbent is different from timing of separation of NOx from the NOx absorbent.

Thus, in purifying gas separated from the absorbents with the exhaust gas purifying catalyst, it is supposed that the exhaust gas purifying catalyst has an oxygen storage capacity (OSC), but oxygen components required for purifying HC becomes insufficient or oxygen released in purifying NOx cannot be stored. This may reduce a purifying capacity (purifying rate) of the exhaust gas purifying catalyst. In this respect, the conventional technique needs improvement in view of a reduction in exhaust emission.

The present invention was made to solve the problems described above, and has an object to provide an exhaust gas purifying apparatus for an internal combustion engine that can satisfactorily prevent a reduction in purifying capacity of an exhaust gas purifying catalyst caused by a difference in timing of separation from absorbents between HC and NOx.

The above object is achieved by an exhaust gas purifying apparatus for an internal combustion engine which includes an exhaust passage including a main exhaust passage through which exhaust gas exhausted from the internal combustion engine flows, and a bypass passage branching off from the main exhaust passage at an upstream connecting portion to the main exhaust passage and again merging with the main exhaust passage at a downstream connecting portion downstream of the upstream connecting portion. An exhaust gas purifying catalyst that is provided in the main exhaust passage and purifies certain components contained in the exhaust gas is also provided. A HC absorbent that is provided in the bypass passage and absorbs HC components contained in the exhaust gas is further provided. A NOx absorbent that is provided in the bypass passage and absorbs NOx components contained in the exhaust gas is further provided. Flow path switching means is further provided for forming a closed path including the exhaust gas purifying catalyst, the HC absorbent and the NOx absorbent in the exhaust passage. Control means is further provided for controlling the flow path switching means so as to form the closed path when HC and NOx absorbed by the HC absorbent and the NOx absorbent respectively are separated from the HC absorbent and the NOx absorbent.

In a second aspect of the present invention, the exhaust gas purifying catalyst may be placed downstream of the downstream connecting portion in the main exhaust passage. The exhaust gas purifying apparatus for the internal combustion engine may includes a second bypass passage that provides communication between a part downstream of the exhaust gas purifying catalyst in the main exhaust passage and a part closer to the upstream connecting portion than the HC absorbent and the NOx absorbent in the bypass passage. The flow path switching means may be placed at least in a connecting point to the main exhaust passage in the second bypass passage.

In a third aspect of the present invention, the exhaust gas purifying apparatus for the internal combustion engine may includes a pump provided in the closed path, and heating means for heating at least one of the exhaust gas purifying catalyst, gas in the closed path, the HC absorbent, and the NOx absorbent. The closed path may be formed and the heating means may be operated during the stop of the internal combustion engine.

In a fourth aspect of the present invention, the exhaust gas purifying apparatus for the internal combustion engine may includes air/fuel ratio adjustment means for adjusting an air/fuel ratio of the internal combustion engine, and air/fuel ratio detection means for detecting an air/fuel ratio in the closed path. The air/fuel ratio adjustment means may adjust an air/fuel ratio at the restart of the internal combustion engine based on an air/fuel ratio detected by the air/fuel ratio detection means during the stop of the internal combustion engine.

In a fifth aspect of the present invention, the exhaust gas purifying apparatus for the internal combustion engine may includes a front stage catalyst for purifying the certain components in the main exhaust passage on an upstream side of the bypass passage. The air/fuel ratio detection means may be placed downstream of the front stage catalyst in the main exhaust passage, and used for controlling an air/fuel ratio of the exhaust gas introduced into the front stage catalyst. The downstream connecting portion may be placed upstream of the air/fuel ratio detection means in the main exhaust passage.

According to the first aspect of the present invention, by controlling the flow path switching means so that the exhaust gas is circulated in the closed path, it can satisfactorily prevent a reduction in purifying capacity of the exhaust gas purifying catalyst caused by a difference in timing of separation from the absorbents between HC and NOx.

According to the second aspect of the present invention, the exhaust gas having passed through the HC absorbent and the NOx absorbent in an absorbing operation at the cold start can be supplied to the exhaust gas purifying catalyst. Specifically, thermal energy of the exhaust gas burned in a cylinder can be supplied to the exhaust gas purifying catalyst. Thus, according to the present invention, electric power consumption required for activating the exhaust gas purifying catalyst at the start can be reduced in addition to the advantage according to the first invention.

According to the third aspect of the present invention, the gas in the closed path is repeatedly circulated and heated even during the stop of the internal combustion engine, thereby facilitating separation of HC and NOx from the absorbents. Also, the exhaust gas purifying catalyst is kept active, thereby allowing purifying of separated HC and NOx.

According to the fourth aspect of the present invention, HC or NOx that cannot be completely purified during the stop of the internal combustion engine but remains in the closed path can be satisfactorily purified at the next restart.

According to the fifth aspect of the present invention, the air/fuel ratio detection means provided for controlling the air/fuel ratio of the exhaust gas introduced into the front stage catalyst can be used for detecting the air/fuel ratio of the exhaust gas flowing in the closed path during the stop of the internal combustion engine.

BEST MODE FOR CARRYING OUT THE INVENTION

First Embodiment
[Configuration of HV System]

Figure 1:
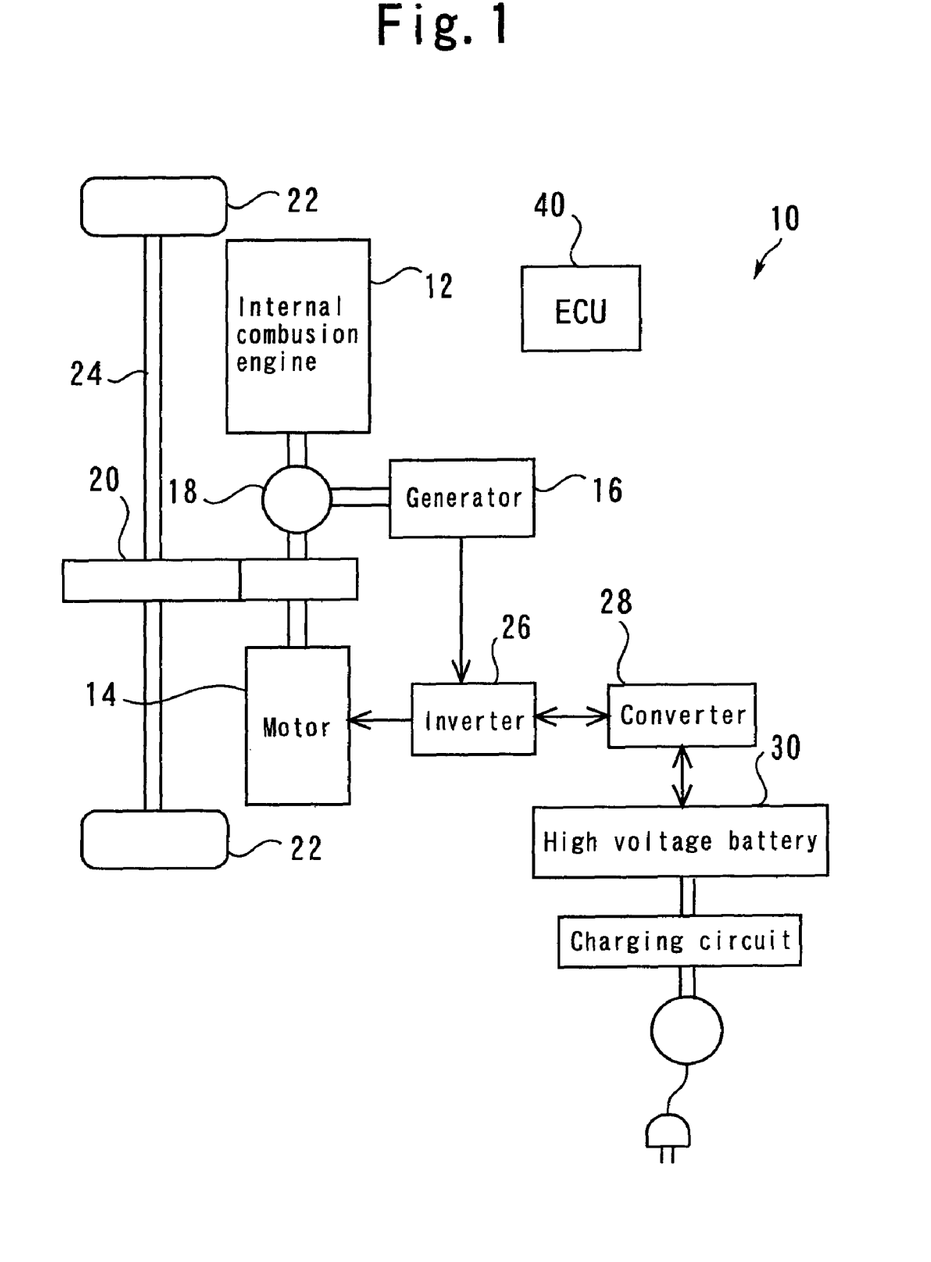
FIG. 1 shows a schematic configuration of a drive system for a plug-in hybrid vehicle to which the present invention is applied.

FIG. 1 shows a schematic configuration of a drive system for a plug-in hybrid vehicle to which the present invention is applied. The drive system 10 includes an internal combustion engine 12 and a vehicle driving motor (hereinafter simply referred to as a "motor") 14 as a power source of the vehicle. The drive system 10 also includes a generator 16 that receives a supply of a drive force and generates electric power. The internal combustion engine 12, the motor 14, and the generator 16 are connected via a power dividing mechanism 18. A reducer 20 is connected to a rotating shaft of the motor 14 connected to the power dividing mechanism 18. The reducer 20 connects between the rotating shaft of the motor 14 and a drive shaft 24 connected to drive wheels 22. The power dividing mechanism 18 divides and distributes a drive force of the internal combustion engine 12 into the generator 16 and the reducer 20. The distribution of the drive force by the power dividing mechanism 18 may be freely changed.

The drive system 10 further includes an inverter 26, a converter 28, and a high voltage battery 30. The inverter 26 is connected to the generator 16 and the motor 14, and also connected to the high voltage battery 30 via the converter 28. The electric power generated by the generator 16 may be supplied to the motor 14 via the inverter 26, or charged into the high voltage battery 30 via the inverter 26 and the converter 28. The electric power charged into the high voltage battery 30 can be supplied to the motor 14 via the converter 28 and the inverter 26.

According to the drive system 10 described above, based on certain conditions, it is possible that the motor 14 is stopped and the drive wheels 22 are rotated only by the drive force of the internal combustion engine 12 or, conversely, the internal combustion engine 12 is stopped and the drive wheels 22 are rotated only by the drive force of the motor 14. It is also possible that both the motor 14 and the internal combustion engine 12 are operated, and the drive wheels 22 are rotated by the drive forces of both thereof. Also, according to the drive system 10, the motor 14 may function as a starter for the internal combustion engine 12. Specifically, part or all of the drive force of the motor 14 is input to the internal combustion engine 12 via the power dividing mechanism 18 at the start of the internal combustion engine 12, thereby allowing cranking of the internal combustion engine 12.

The drive system 10 in the present embodiment is controlled by an ECU (Electronic Control Unit) 40. The ECU 40 generally controls the drive system 10 including the internal combustion engine 12, the motor 14, the generator 16, the power dividing mechanism 18, the inverter 26, the converter 28, or the like. The above described high voltage battery 30 is configured to receive a supply of electric power from outside the vehicle (domestic power supply or the like). Specifically, the drive system 10 in the present embodiment is configured as a drive system for a so-called plug-in hybrid vehicle.

[Configuration of Exhaust Gas Purifying Apparatus]

Figure 2:
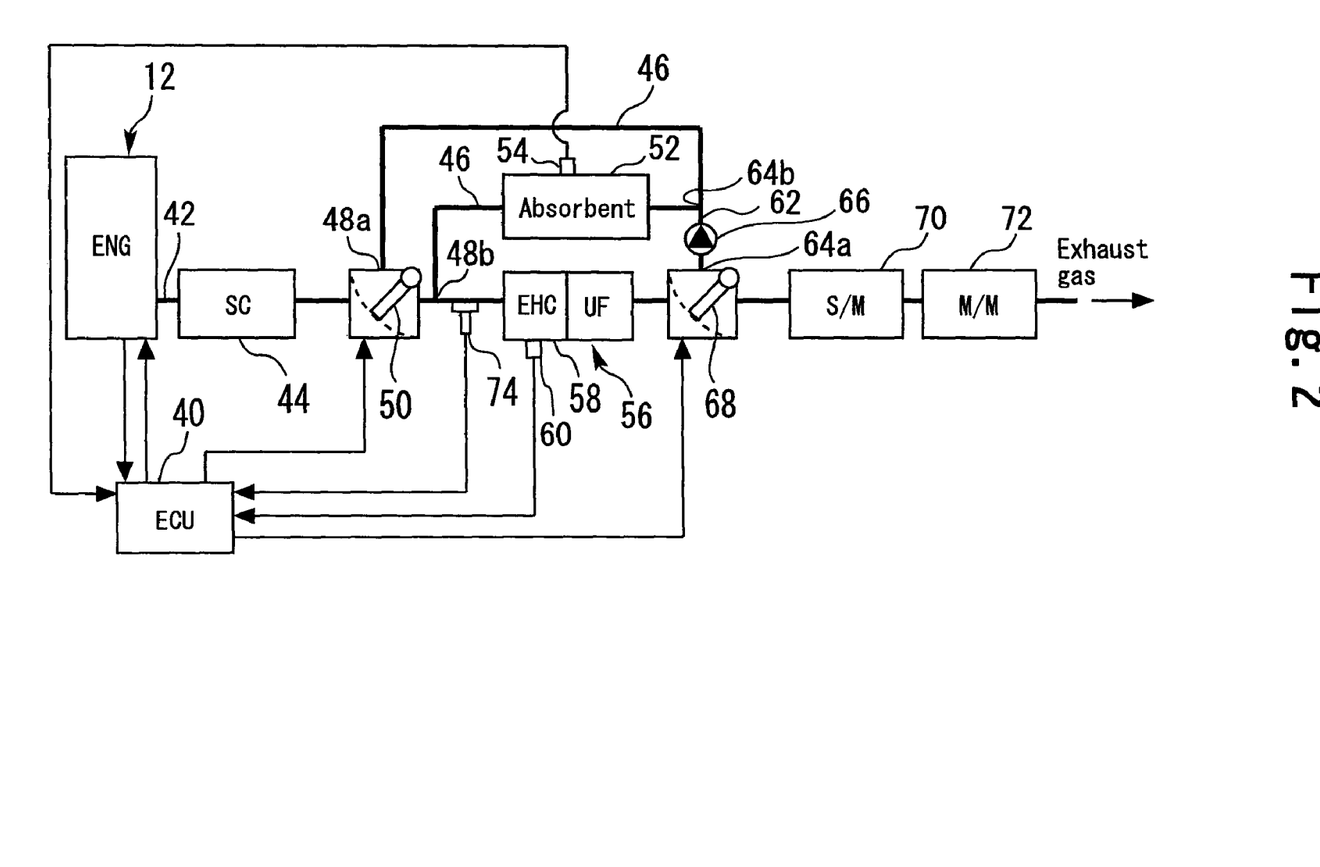
FIG. 2 illustrates a configuration of an exhaust gas purifying apparatus mounted in the internal combustion engine system in FIG. 1.

FIG. 2 illustrates a configuration of an exhaust gas purifying apparatus mounted in the internal combustion engine system in FIG. 1. The internal combustion engine 12 in FIG. 2 includes an intake passage (not shown) for taking air into a cylinder, and an exhaust passage through which exhaust gas exhausted from the cylinder flows.

The exhaust passage in the present embodiment includes a main exhaust passage 42 for exhausting the exhaust gas from the cylinder, and a first bypass passage 46 and a second bypass passage 62 described later. In an upstream part in the main exhaust passage 42, a front stage catalyst (SC) 44 that can purify the exhaust gas is placed.

The first bypass passage 46 is configured as a passage bypassing the main exhaust passage 42 on a downstream side of the front stage catalyst 44 in the main exhaust passage 42. More specifically, the first bypass passage 46 is configured to branch off from the main exhaust passage 42 at an upstream connecting portion 48a placed downstream of the front stage catalyst 44, and again merge with the main exhaust passage 42 at a downstream connecting portion 48b placed downstream of the upstream connecting portion 48a. The first bypass passage 46 is formed so that a length of a part from the upstream connecting portion 48a to an absorbent 52 described later is longer than a length of a part from the absorbent 52 to the downstream connecting portion 48b.

In the upstream connecting portion 48a, a first exhaust switching valve 50 is placed for switching a flow target of the exhaust gas between the main exhaust passage 42 and the first bypass passage 46. In FIG. 2, an HC absorbent for absorbing HC components and an NOx absorbent for absorbing NOx components are shown as an integral absorbent 52, but the HC absorbent and the NOx absorbent may be separate absorbents. The downstream connecting portion 48b is placed immediately below and close to the first exhaust switching valve 50 so that the downstream connecting portion 48*b* is placed on as upstream a side as possible in the main exhaust passage 42.

In the middle of the first bypass passage 46, the absorbent 52 is placed having a function of absorbing certain components such as the HC components and the NOx components contained in the exhaust gas. Into the absorbent 52, an absorbent temperature sensor 54 for detecting a temperature of the absorbent 52 is integrated.

Downstream of the downstream connecting portion 48*b* in the main exhaust passage 42, an underfloor catalyst (UF) 56 that can purify the exhaust gas is placed. An upstream part of the underfloor catalyst 56 is configured as a catalyst with an electric heater (hereinafter referred to as an EHC (Electric Heated Catalyst)) 58. The heater included in the EHC 58 receives a supply of electric power from the high voltage battery 30, and the EHC 58 can be heated by the ECU 40 appropriately controlling energization. By such energization control, the EHC 58 can keep predetermined activation temperature. Into the EHC 58, a catalyst temperature sensor 60 for detecting the temperature of the EHC 58 is integrated.

One end of the second bypass passage 62 is connected to the main exhaust passage 42 at a part (a main exhaust passage side connecting portion 64*a*) downstream of the underfloor catalyst 56 in the main exhaust passage 42. In the middle of the second bypass passage 62, a motor-driven pump 66 is placed. The pump 66 is connected to the ECU 40. The other end of the second bypass passage 62 communicates with a part (a first bypass passage side connecting portion 64*b*) between the upstream connecting portion 48*a* and the absorbent 52 in the first bypass passage 46.

In the main exhaust passage side connecting portion 64*a*, a second exhaust switching valve 68 is placed for switching a flow target of the exhaust gas between the main exhaust passage 42 and the second bypass passage 62. In the main exhaust passage 42 downstream of the second exhaust switching valve 68, a sub muffler 70 and a main muffler 72 are placed in series in order from the upstream side.

In the main exhaust passage 42 downstream of the front stage catalyst 44, an A/F sensor 74 for detecting an air/fuel ratio of the exhaust gas at the position is placed. The A/F sensor 74 is a sensor used for control performed for sufficiently bringing out a purifying capacity of the front stage catalyst 44, more specifically, control of the air/fuel ratio of the exhaust gas introduced into the front stage catalyst 44 (air/fuel ratio feedback control). The downstream connecting portion 48*b* of the first bypass passage 46 described above is placed upstream of the A/F sensor 74 in the main exhaust passage 42.

[Operation of Exhaust Gas Purifying Apparatus]

Figure 3:
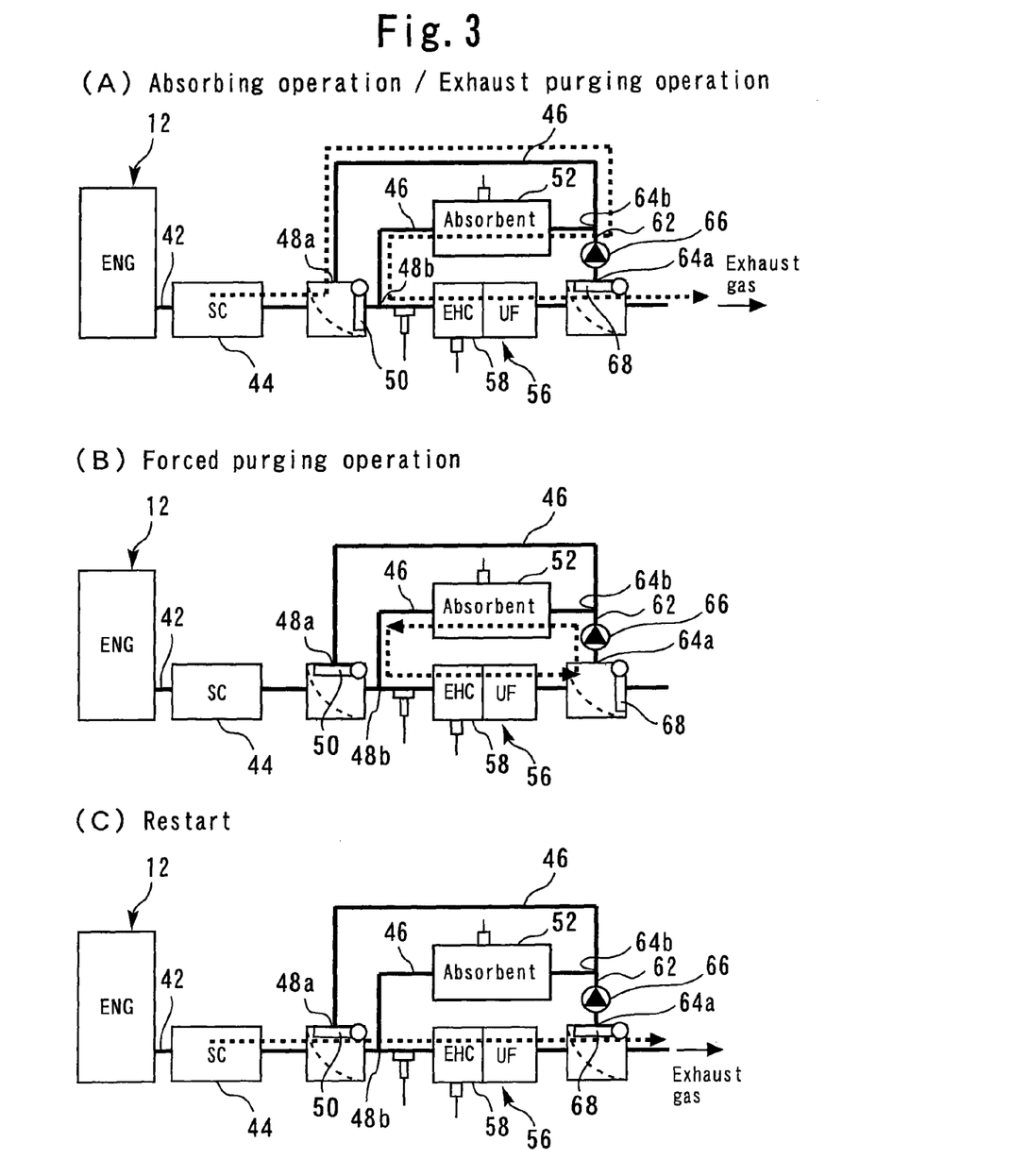
FIG. 3 illustrates an operation of the exhaust gas purifying apparatus according to Embodiment 1 of the present invention.

FIG. 3 illustrates an operation of the exhaust gas purifying apparatus according to the first embodiment of the present invention.

(Absorbing Operation)

First, with reference to FIG. 3(A), an operation for causing the absorbent 52 to absorb the certain components (such as the HC components and the NOx components) in the exhaust gas exhausted from the cylinder at the cold start of the internal combustion engine 12 will be described.

As shown in FIG. 3(A), the absorbing operation is started in a state where the first exhaust switching valve 50 blocks the main exhaust passage 42 and the second exhaust switching valve 68 blocks the second bypass passage 62 at the cold start of the internal combustion engine 12. When the exhaust switching valves 50 and 68 are thus controlled, all of the exhaust gas exhausted from the internal combustion engine 12 is introduced from the main exhaust passage 42 into the first bypass passage 46 via the upstream connecting portion 48*a*. The exhaust gas introduced into the first bypass passage 46 passes through the absorbent 52 and is then returned to the main exhaust passage 42. Then, the exhaust gas passes through the underfloor catalyst 56 including the EHC 58 and is then released into the atmosphere.

By the above described absorbing operation, HC and NOx contained in the exhaust gas are absorbed by the absorbent 52 and removed. This can prevent HC and NOx from being released into the atmosphere at the cold start when the front stage catalyst 44 and the EHC 58, or the like have not yet been activated.

(Exhaust Purging Operation)

In the system of the present embodiment, a flow path pattern shown in FIG. 3(A) is selected also when an exhaust purging operation for separating HC or the like from the absorbent 52 is performed during operation of the internal combustion engine 12. More specifically, a flow path pattern is switched to a state shown in FIG. 3(A) when predetermined timing for purging comes during the operation of the internal combustion engine 12, and thus the exhaust gas relatively heated after the start is supplied to the absorbent 52. This allows HC or the like to be separated from the absorbent 52, and allows separated HC or the like to be purified by the active underfloor catalyst 56.

(Forced Purging Operation)

Next, with reference to FIG. 3(B), a forced purging operation for forcedly separating HC or the like from the absorbent 52 during the stop of the internal combustion engine 12 will be described. More specifically, the forced purging operation is a purging operation performed when the internal combustion engine 12 is stopped in a state where the absorbing operation of HC or the like by the absorbent 52 is partly or completely performed at the cold start of the internal combustion engine 12 and thus HC or the like is absorbed by the absorbent 52, or a state where the exhaust purging operation is not completed after the absorbing operation and thus HC or the like is absorbed by the absorbent 52.

In the forced purging operation, as shown in FIG. 3(B), the first exhaust switching valve 50 is controlled to block the first bypass passage 46, and the second exhaust switching valve 68 is controlled to block an end opening to the atmosphere of the main exhaust passage 42. In the state where the exhaust switching valves 50 and 68 are thus controlled, a closed path is formed among the main exhaust passage 42, the first bypass passage 46 and the second bypass passage 62 as shown by the arrow in FIG. 3(B).

The forced purging operation is started by performing energization control of the EHC 58 to activate the EHC 58 and operating the pump 66, with the above described closed path being formed. By such a forced purging operation, the exhaust gas remaining in the main exhaust passage 42 or the like during the stop of the internal combustion engine 12 is circulated in the closed path as shown in FIG. 3(B). Then, the exhaust gas is continuously circulated and thus increasingly heated by the EHC 58. This allows hot exhaust gas to be supplied to the absorbent 52. This facilitates separation of HC or the like from the absorbent 52, and allows HC or the like separated from the absorbent 52 to be purified by the active EHC 58 (underfloor catalyst 56).

(Restart)

Next, with reference to FIG. 3(C), a flow path pattern used at the restart (except at the cold start when the underfloor catalyst 56 is not active) of the internal combustion engine 12 will be described.

At the restart (normal operation) of the internal combustion engine 12, as shown in FIG. 3(C), the first exhaust switching valve 50 is controlled to block the first bypass passage 46, and the second exhaust switching valve 68 is controlled to block the second bypass passage 62. With such a flow path pattern, the exhaust gas exhausted from the internal combustion engine 12 passes through the main exhaust passage 42 without passing through the absorbent 52, and passes through the EHC 58 (underfloor catalyst 56) and is then released into the atmosphere.

[Detailed Processes in the First Embodiment]

Figure 4:
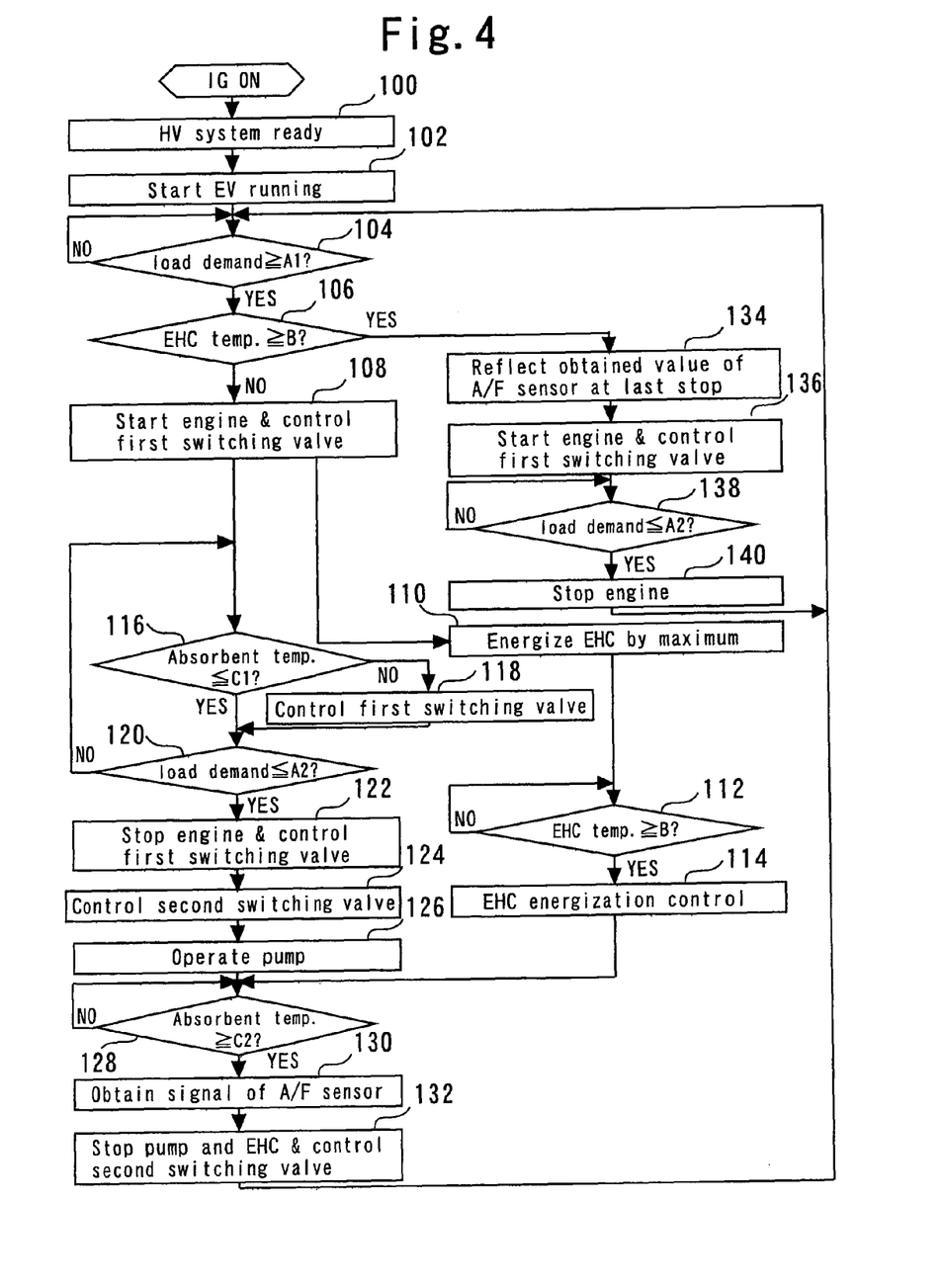
FIG. 4 is a flowchart of a routine that is executed in the first embodiment of the present invention.

FIG. 4 is a flowchart of a routine performed by the ECU 40 for reducing exhaust emission at the cold start of the internal combustion engine 12 in the first embodiment of the present invention. This routine is started when a switch for starting the plug-in hybrid vehicle is turned an (ignition is on).

In the routine in FIG. 4, when the ignition is on, the HV system becomes ready (Step 100). Then, according to a vehicle driver's demand, EV running using only the motor 14 as a power source is started (Step 102).

Then, a load demand from the driver is detected based on an accelerator opening degree, and it is judged whether the load demand is a predetermined value A1 or more (Step 104). When it is judged that the load demand is A1 or more, then it is determined whether a floor temperature of the EHC 58 is a predetermined temperature B or higher (Step 106). The temperature B is a threshold for determining whether the EHC 58 is active.

When it is judged that the floor temperature of the EHC 58 is lower than the temperature B, that is, when it can be determined that the EHC 58 is not active, then the internal combustion engine 12 is started, and the first exhaust switching valve 50 is controlled so that the exhaust gas is introduced into the absorbent 52 (Step 108). Thus, the absorbing operation is started. (see FIG. 3(A)).

When the absorbing operation is started, processes in Steps 110 to 114 and processes in Steps 116 to 126 described below are concurrently performed.

Specifically, when the absorbing operation is started, first, the EHC 58 is energized so that maximum electric power is supplied to the EHC 58 to early activate the EHC 58 (Step 110). Then, it is judged whether the floor temperature of the EHC 58 becomes the predetermined temperature B or higher (Step 112). When it is judged that the floor temperature of the EHC 58 is increased to the temperature B or higher, the electric power supplied to the EHC 58 is reduced, and the energization of the EHC 58 is controlled so that the floor temperature of the EHC 58 keeps a predetermined activation temperature (Step 114).

Also, when the absorbing operation is started, it is judged whether a temperature of the absorbent 52 is a predetermined temperature C1 or lower (Step 116). The temperature C1 is an upper limit value of a temperature that allows the absorbing operation by the absorbent 52. When it is judged that the absorbent temperature is not C1 or lower, that is, when it can be determined that the absorbing operation cannot be continued any longer, the first exhaust switching valve 50 is controlled so that the exhaust gas flows through the main exhaust passage 42 without passing through the absorbent 52 (Step 118). Thus, the absorbing operation is finished.

Next, it is judged whether the load demand from the driver is a predetermined value A2 (<A1) or less (Step 120). When it is judged that the load demand is A2 or less, that is, when it can be determined that a high load demand from the driver is dissolved, the internal combustion engine 12 is stopped. Also in this case, the first exhaust switching valve 50 is controlled so that the exhaust gas flows through the main exhaust passage 42 without passing through the absorbent 52 (Step 122).

On the other hand, when it is judged in Step 116 that the absorbent temperature is C1 or less (that is, when it can be determined that the absorbing operation can be still continued) and that the load demand is A2 or less, similarly, the internal combustion engine 12 is stopped and the first exhaust switching valve 50 is controlled (Step 122). In such a case, that is, in the case where the high load demand to the vehicle is dissolved even during the absorbing operation, the internal combustion engine 12 is stopped to return to the EV running. Thus, the absorbing operation is finished.

In Step 122, in the case where the internal combustion engine 12 is stopped and the first exhaust switching valve 50 is controlled, then the second exhaust switching valve 68 is controlled so that the main exhaust passage 42 and the second bypass passage 62 communicate with each other (Step 124), and the pump 66 is operated (Step 126). Thus, the forced purging operation is started (see FIG. 3(B)).

In the routine in FIG. 4, the processes in Steps 110 to 114 and the processes in Steps 116 to 126 described above are concurrently performed, and then it is judged whether the temperature of the absorbent 52 is a predetermined temperature C2 or higher (Step 128). The temperature C2 is a value preset as a temperature of the absorbent 52 that allows determination that the purging operation is completed. By such a process, a finish time point of the purging operation (separating operation) can be precisely determined based on the temperature of the absorbent 52.

When it is judged that the absorbent temperature is C2 or higher, that is, when it is judged that purging using the forced purging operation is completed, a signal of the A/F sensor 74 is obtained (Step 130). Then, the operation of the pump 66 and the energization of the EHC 58 are stopped, and the second exhaust switching valve 68 is controlled to block the second bypass passage 62 (Step 132). Thus, the forced purging operation is finished. More specifically, in Step 130, an air/fuel ratio of the gas in the closed path at the finish time point of the forced purging operation is obtained.

On the other hand, when it is judged in Step 106 that the floor temperature of the EHC 58 is the temperature B or higher, that is, when it can be determined that the EHC 58 is active, a value obtained by the A/F sensor 74 at the last (latest) stop of the internal combustion engine 12 is reflected on a fuel injection amount at the start (Step 134), and then the internal combustion engine 12 is restarted, and the first exhaust switching valve 50 is controlled so that the exhaust gas flows through the main exhaust passage 42 without passing through the absorbent 52 (Step 136).

More specifically, in Step 134, based on the air/fuel ratio of the gas in the closed path at the finish time point of the last forced purging operation, when the air/fuel ratio is richer than stoichiometric, the fuel injection amount is determined so that an operation is performed at an air/fuel ratio leaner than stoichiometric at the restart of the internal combustion engine 12. On the other hand, when the air/fuel ratio is leaner than stoichiometric, the fuel injection amount is determined so that the operation is performed at an air/fuel ratio richer than stoichiometric at the restart of the internal combustion engine 12. For the fuel injection amounts in these cases, an amount of correction to be leaner (richer) than stoichiometric at the restart is increased with increasing amount of shift of the air/fuel ratio to be richer (leaner) than stoichiometric.

Then, after the restart of the internal combustion engine 12, it is judged whether the load demand from the driver is A2 or less (Step 138). When it is judged that the load demand from the driver is A2 or less, the internal combustion engine 12 is stopped (Step 140).

Then, the process in Step 104 and thereafter are repeatedly performed until the vehicle system (HV system) is stopped.

In the system including the absorbent that can simultaneously absorb HC and NOx as in the system according to the present embodiment, separation timing from the absorbent is different between HC and NOx. More specifically, NOx is separated more easily than HC, and thus a larger amount of NOx is separated in an early stage of the purging operation from the absorbent, while a larger amount of HC is separated in a late stage of the purging operation. Thus, the underfloor catalyst has an oxygen storage capacity (OSC), but cannot store oxygen released in purifying NOx in the early stage of the purging operation. In the late stage of the purging operation, oxygen components required for purifying HC become insufficient. This may reduce a purifying capacity (purifying rate) of the underfloor catalyst to deteriorate exhaust emission.

On the other hand, by the above described routine shown in FIG. 4, when the internal combustion engine 12 is stopped with HC and NOx being absorbed by the absorbent 52, the pump 66 is driven with the exhaust switching valves 50 and 68 being controlled to form the closed path (the forced purging operation). Thus, HC and NOx different in separation timing from the absorbent 52 are circulated while remaining in the closed path, and thus amounts of HC and NOx separated from the absorbent 52 can be approximated through the entire purging operation period. Thus, by such a forced purging operation, the exhaust gas containing HC and NOx separated from the absorbent 52 is repeatedly circulated in the closed path, thereby preventing a reduction in purifying capacity of the underfloor catalyst 56 without an influence of the difference in separation timing between HC and NOx from the absorbent.

By the above described routine, the forced purging operation is performed with the EHC 58 being heated. Thus, the gas in the closed path is repeatedly circulated and heated even during the stop of the internal combustion engine 12, thereby facilitating separation of HC and NOx from the absorbent 52. Also, the EHC 58 (underfloor catalyst 56) is kept active, thereby allow purifying of separated HC and NOx.

However, the amounts of HC and NOx absorbed by the absorbent 52 at the cold start are not always the same, and either HC or NOx is absorbed in larger amount. Thus, it is supposed that even when HC and NOx are completely separated from the absorbent 52 by the forced purging operation, excess HC and NOx depending on deviation of the value of the A/F sensor 74 from stoichiometric are not purified by the underfloor catalyst 56 but remain in the closed path or the underfloor catalyst 56.

On the other hand, by the processes of the above described routine, based on the air/fuel ratio of the gas flowing in the closed path at the finish time point of the forced purging operation, the air/fuel ratio at the restart thereafter is controlled. More specifically, an amount of finally remaining (excess) HC (or NOx) at the finish time point of the forced purging operation is judged based on an output of the A/F sensor 74. Then, when the output is rich (when there is insufficient oxygen), it is judged that there is excess HC, and when the output is lean (when there is excess oxygen), it is judged that there is excess NOx. When the output is rich, a lean operation is performed at the next restart, and when the output is lean, a rich operation is performed at the next restart. Thus, HC or NOx that cannot be completely purified by the forced purging operation performed during the stop of the internal combustion engine 12 but remains in the closed path can be completely purified at the next restart.

The exhaust gas purifying apparatus according to the present embodiment shown in FIG. 2 includes the second bypass passage 62 connecting between the main exhaust passage 42 downstream of the EHC 58 and the first bypass passage 46 upstream of the absorbent 52. Then, the closed path is formed between the EHC 58 placed downstream of the downstream connecting portion 48b in the first bypass passage 46 in which the absorbent 52 is placed and the absorbent 52 to perform the forced purging operation. According to such a configuration of the closed path, HC and NOx separated from the absorbent 52 can be purified by the EHC 58 in the forced purging operation, and also the exhaust gas having passed through the absorbent 52 in the absorbing operation at the cold start can be supplied to the EHC 58. Specifically, thermal energy of the exhaust gas burned in the cylinder can be supplied to the EHC 58. Thus, electric power consumption required for activating the EHC 58 at the start can be reduced.

In the exhaust gas purifying apparatus according to the present embodiment in FIG. 2, the downstream connecting portion 48b of the first bypass passage 46 is placed upstream of the A/F sensor 74 in the main exhaust passage 42. According to such a configuration, the A/F sensor 74 provided for controlling the air/fuel ratio of the exhaust gas introduced into the front stage catalyst 44 can be used for detecting the air/fuel ratio of the exhaust gas flowing in the closed path during the stop of the internal combustion engine 12.

In the first embodiment described above, the EHC 58 is heated in the forced purging operation performed during the stop of the internal combustion engine 12. However, not limited to the exhaust gas purifying catalyst (EHC 58) placed in the closed path, for example, the gas circulated in the closed path, or the HC absorbent and the NOx absorbent (absorbent 52) placed in the closed path may be heated in the forced purging operation in the present invention.

In the first embodiment described above, the second bypass passage 62 is provided, and the closed path is formed between the EHC 58 placed downstream of the downstream connecting portion 48b and the absorbent 52 to perform the forced purging operation. However, the closed path formed between the exhaust gas purifying catalyst and the HC absorbent and the NOx absorbent for separating absorbed HC and NOx from the absorbent in the present invention is not limited to the path including the second bypass passage 62 as described above. Specifically, for example, without the second bypass passage as described above, a second exhaust switching valve may be placed in a downstream connecting portion in a first bypass passage, and an exhaust gas purifying catalyst may be provided between a first exhaust switching valve and the second exhaust switching valve in a main exhaust passage.

In the first embodiment described above, the underfloor catalyst 56 including the EHC 58 corresponds to an "exhaust gas purifying catalyst" in the first aspect of the present invention, the absorbent 52 corresponds to an "HC absorbent" and an "NOx absorbent" in the first aspect of the present invention, and the first exhaust switching valve 50 and the second exhaust switching valve 68 correspond to "flow path switching means" in the first aspect of the present invention. Also, the ECU 40 performs the processes in Steps 118 (or 122) and 124 to realize "control means" in the first aspect of the present invention.

Further, the main exhaust passage side connecting portion 64a corresponds to a "connecting point" in the second aspect of the present invention.

Further, the heater included in the EHC 58 corresponds to "heating means" in the third aspect of the present invention.

Further, the ECU 40 performs the processes in Steps 134 and 136 to realize "air/fuel ratio adjustment means" in the fourth aspect of the present invention, and the A/F sensor 74 corresponds to "air/fuel ratio detection means" in the fourth aspect of the present invention.

The invention claimed is:

1. An exhaust gas purifying apparatus for an internal combustion engine, comprising:
    an exhaust passage including a main exhaust passage through which exhaust gas exhausted from the internal combustion engine flows, and a bypass passage branching off from the main exhaust passage at an upstream connecting portion of the main exhaust passage and again merging with the main exhaust passage at a downstream connecting portion downstream of the upstream connecting portion;
    an exhaust gas purifying catalyst that is provided in the main exhaust passage and purifies certain components contained in the exhaust gas;
    an HC absorbent that is provided in the bypass passage and absorbs HC components contained in the exhaust gas;
    an NOx absorbent that is provided in the bypass passage and absorbs NOx components contained in the exhaust gas;
    one or more exhaust switching valves located within the exhaust passage so as to be capable of forming a closed path including the exhaust gas purifying catalyst, the HC absorbent and the NOx absorbent in the exhaust passage; and
    an electronic control unit including program logic that, when executed by the electronic control unit, controls the one or more exhaust switching valves so as to form the closed path when separating HC and NOx from, respectively, the HC absorbent and the NOx absorbent.

2. The exhaust gas purifying apparatus for the internal combustion engine according to claim 1,
    wherein the bypass passage is a first bypass passage;
    wherein the exhaust gas purifying catalyst is placed downstream of the downstream connecting portion in the main exhaust passage;
    wherein the exhaust gas purifying apparatus for the internal combustion engine further comprises a second bypass passage that provides communication between a part downstream of the exhaust gas purifying catalyst in the main exhaust passage and a part closer to the upstream connecting portion than the HC absorbent and the NOx absorbent in the first bypass passage; and
    wherein the one or more exhaust switching valves is placed at least in a connecting point to the main exhaust passage in the second bypass passage.

3. The exhaust gas purifying apparatus for the internal combustion engine according to claim 1,
    wherein the exhaust gas purifying apparatus for the internal combustion engine further comprises a pump provided in the closed path, and a heater for heating at least one of the exhaust gas purifying catalyst, gas in the closed path, the HC absorbent, and the NOx absorbent; and
    wherein the closed path is formed and the heater is operated during the stop of the internal combustion engine.

4. The exhaust gas purifying apparatus for the internal combustion engine according to claim 3,
    further comprising an air/fuel sensor for detecting an air/fuel ratio in the closed path,
    wherein the electronic control unit includes program logic that, when executed by the electronic control unit, adjusts an air/fuel ratio of the internal combustion engine at the restart of the internal combustion engine based on the air/fuel ratio detected by the air/fuel sensor during the stop of the internal combustion engine.

5. The exhaust gas purifying apparatus for the internal combustion engine according to claim 4,
    wherein the exhaust gas purifying apparatus for the internal combustion engine further comprises a front stage catalyst for purifying the certain components in the main exhaust passage on an upstream side of the bypass passage;
    wherein the air/fuel sensor is placed downstream of the front stage catalyst in the main exhaust passage, and is used for controlling the air/fuel ratio of the exhaust gas introduced into the front stage catalyst; and
    wherein the downstream connecting portion is placed upstream of the air/fuel sensor in the main exhaust passage.

* * * * *